(12) United States Patent
Wang

(10) Patent No.: US 12,353,650 B2
(45) Date of Patent: Jul. 8, 2025

(54) MOUSE STRUCTURE

(71) Applicant: Voyetra Turtle Beach, Inc., White Plains, NY (US)

(72) Inventor: Wei Chuan Wang, New Taipei (TW)

(73) Assignee: Voyetra Turtle Beach, Inc., San Diego, CA (US)

( * ) Notice: Subject to any disclaimer, the term of this patent is extended or adjusted under 35 U.S.C. 154(b) by 0 days.

(21) Appl. No.: 18/723,573

(22) PCT Filed: Dec. 19, 2022

(86) PCT No.: PCT/US2022/081901
§ 371 (c)(1),
(2) Date: Jun. 24, 2024

(87) PCT Pub. No.: WO2023/122519
PCT Pub. Date: Jun. 29, 2023

(65) Prior Publication Data
US 2025/0060839 A1    Feb. 20, 2025

(30) Foreign Application Priority Data

Dec. 24, 2021 (TW) ............................. 110215397
Dec. 28, 2021 (CN) ...................... 202123328923.4

(51) Int. Cl.
*G06F 3/0354* (2013.01)
*G06F 3/038* (2013.01)

(52) U.S. Cl.
CPC ........ *G06F 3/03543* (2013.01); *G06F 3/0383* (2013.01)

(58) Field of Classification Search
CPC ... G06F 3/03543; G06F 3/0383; G06F 3/0362
See application file for complete search history.

(56) References Cited

U.S. PATENT DOCUMENTS

| | | |
|---|---|---|
| 2010/0201626 A1 | 8/2010 | Krah et al. |
| 2010/0253628 A1 | 10/2010 | Jacke et al. |
| 2011/0069008 A1 | 3/2011 | Kao |
| 2012/0106056 A1 | 5/2012 | Lee et al. |
| 2012/0293414 A1 | 11/2012 | Wang et al. |
| 2021/0141468 A1* | 5/2021 | Lee ....................... G06F 3/0383 |
| 2021/0208703 A1* | 7/2021 | Tseng ................... G06F 3/0202 |
| 2021/0342019 A1* | 11/2021 | Lin ..................... G06F 3/03543 |

(Continued)

*Primary Examiner* — Jonathan A Boyd
(74) *Attorney, Agent, or Firm* — Sheppard Mullin Richter & Hampton LLP

(57) ABSTRACT

A mouse structure includes a shell, a control circuit, a button and an elastic member. The shell includes a base and an upper cover. A boss extends from the upper cover towards the base. The control circuit includes a circuit board and a switch arranged thereon. The button comprises a hollow cylindrical body extending through the upper cover and having a pressing surface and a stop surface opposite each other. The elastic member comprises an embedded section snapped to the boss, a pressing part and an elastic part. The elastic part being connected between the embedded section and the pressing part and extending through into the hollow cylindrical body. The pressing part is elastically pressed against the stop surface to pull down the hollow cylindrical body, so that the pressing surface is attached to a surface of the switch.

10 Claims, 7 Drawing Sheets

(56) References Cited

U.S. PATENT DOCUMENTS

2021/0365129 A1* 11/2021 Chen .................. G06F 3/03543
2022/0011873 A1* 1/2022 Kauh .................. G06F 3/0362
2023/0027021 A1* 1/2023 Li ...................... G06F 3/03543

* cited by examiner

MOUSE STRUCTURE

CROSS-REFERENCE TO RELATED APPLICATIONS

This application is a National Phase application under 35 U.S.C. § 371 of PCT Application No. PCT/US2022/081901, filed Dec. 19, 2022, which application claims the benefit of Taiwan Patent Application No. 110215397, filed Dec. 24, 2021 (which issued as Taiwan Patent No. M628527 on Jun. 21, 2022), and Chinese Patent Application No. 202123328923.4, filed Dec. 28, 2021 (which issued as Chinese Patent No. ZL 202123328923.4 on Jul. 26, 2022), which are hereby incorporated herein by reference in their entirety.

TECHNICAL FIELD

The present utility model relates to a mouse structure, in particular to a mouse structure which can be easily manufactured and assembled, and can eliminate a tolerance gap(s).

BACKGROUND ART

A mouse is one of the indispensable accessories for a desktop computer. It mainly includes a shell and certain circuit components installed in the shell. The circuit components include a circuit board(s), a switch(es), and the like. The shell is usually provided with at least two buttons (that is, a left mouse button and a right mouse button). When a user presses the button(s), the structure below the button(s) further presses the switch to generate a signal so as to achieve the effect of controlling the computer.

However, for the existing mice, due to the manufacturing, there is a gap between the button and the surface of a switch button. This results in an idle stroke when a user presses the button. That is to say, the button cannot be directly and accurately pressed against the surface of the switch button due to the tolerance gap. As a result, a user may experience the problems of delay, dullness or unclear feedback when pressing the mouse button. In addition, these problems are especially noticeable when the user clicks continuously and quickly.

SUMMARY OF THE UTILITY MODEL

The main purpose of the present utility model is to eliminate the gap generated by the tolerance by means of an elastic member, and make the overall structure to be easily manufactured and assembled.

In order to achieve the purpose mentioned above, the present utility model provides a mouse structure, which comprises a shell, a control circuit, a plurality of buttons, and a plurality of elastic members. The shell comprises a base and an upper cover covering the base, wherein the upper cover extends toward the base with a plurality of bosses. The control circuit is arranged on the base, wherein the control circuit comprises a circuit board and a plurality of switches arranged on the circuit board. Each of the buttons has a hollow cylindrical body penetrating the upper cover, and each of the hollow cylindrical bodies has a pressing surface and a stop surface opposite to each other. Each of the elastic members has an embedded section, an elastic part, and a pressing part, each of the embedded sections is clamped to one of the bosses, each of the elastic parts is connected between one of the embedded sections and one of the pressing parts and penetrates into one of the hollow cylindrical bodies, and each of the pressing parts is elastically pressed against one of the stop surfaces to pull down one of the hollow cylindrical bodies, so that each of the pressing surfaces is attached to a surface of one of the switches.

Optionally, an extension space is provided on a side of each of the hollow cylindrical bodies, and each of the stop surfaces is exposed in one of the extension spaces.

Optionally, each of the elastic parts is U-shaped and bridges two ends of one of the embedded sections, and each of the elastic parts is respectively extended reversely toward one of the embedded sections with an extending section connected to one of the pressing parts.

Optionally, each of the extending sections penetrates into one of the hollow cylindrical bodies through one of the extension spaces.

Optionally, each of the extending sections is horizontally extended and connected to one of the pressing parts.

Optionally, each of the extending sections extends obliquely toward one of the switches and is connected to one of the pressing parts.

Optionally, each of the bosses is provided with a support seat, one end of the support seat is formed with a limit cover, and an interlayer space is formed between the limit cover and the support seat for clamping the embedded section.

Optionally, the limit cover is extended with a surrounding wall surrounding the support seat, and the surrounding wall is configured to limit the embedded section.

Optionally, the elastic member extends from the embedded section toward the pressing part with an attaching section, and the attachment section is attached to the support seat.

Optionally, a retaining wall is formed at an end of the support seat away from the limit cover, and the retaining wall limits the attachment section.

The present utility model also has the following effects: by means of the extension space of the hollow cylindrical body, the elastic member can extend therein and press against the stop surface; by means of the pressing part elastically pressing the stop surface to pull down the hollow cylindrical body, the pressing surface can attach to the surface of the switch to ensure that the switch can be triggered when the button is pressed. By means of the limit cover, the support seat and the interlayer space, the embedded section of the elastic member can be clamped and the elastic part and the pressing part thereof can be in a suspended state. By means of the retaining wall and the surrounding wall, the attachment section and the embedded section can be limited longitudinally and transversely to achieve the effect of position limiting, which can cooperate with the interlayer space to effectively fix and limit the elastic member on the boss.

Figure 1:
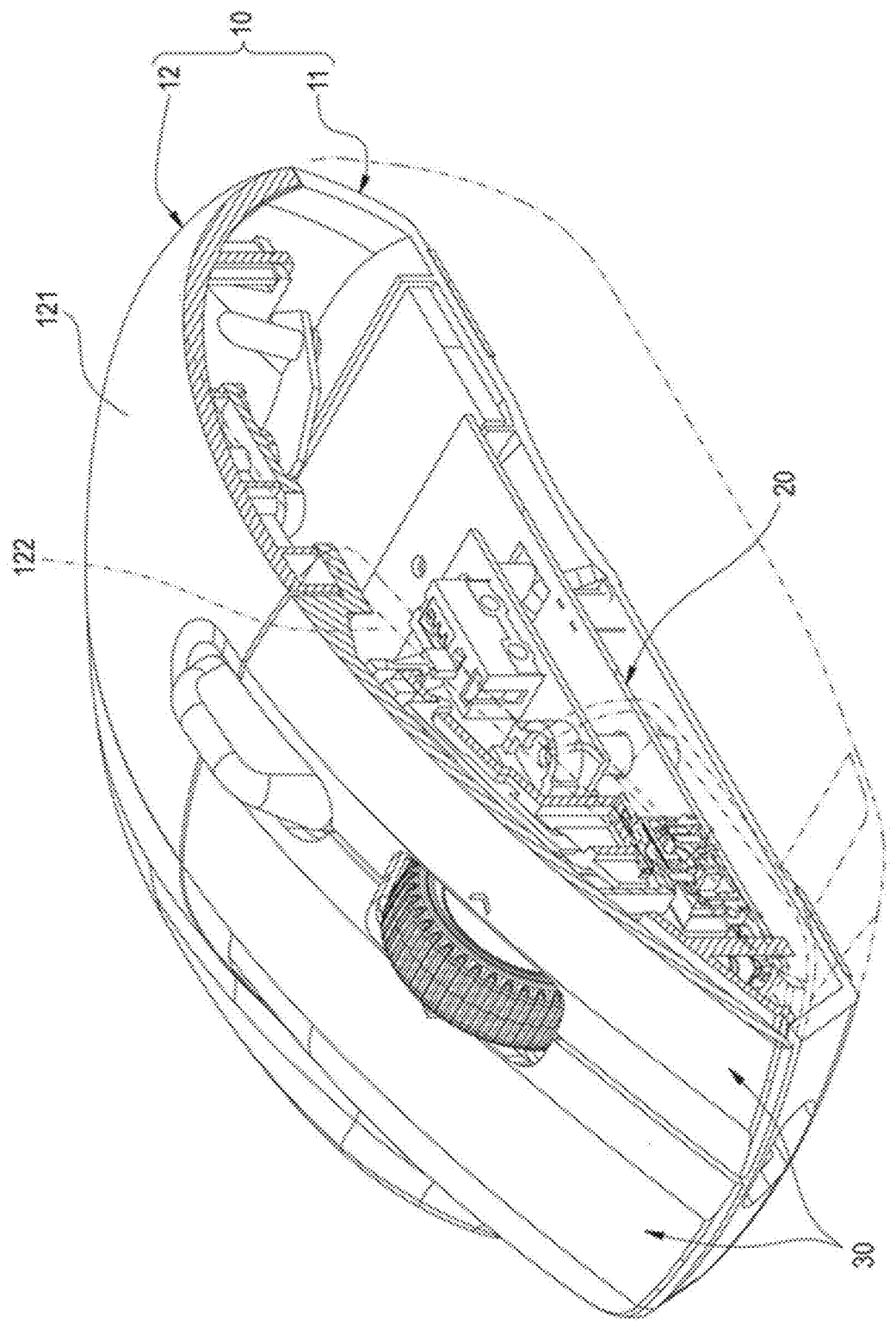
FIG. 1 is a schematic perspective sectional view of the present utility model.
Figure 2:
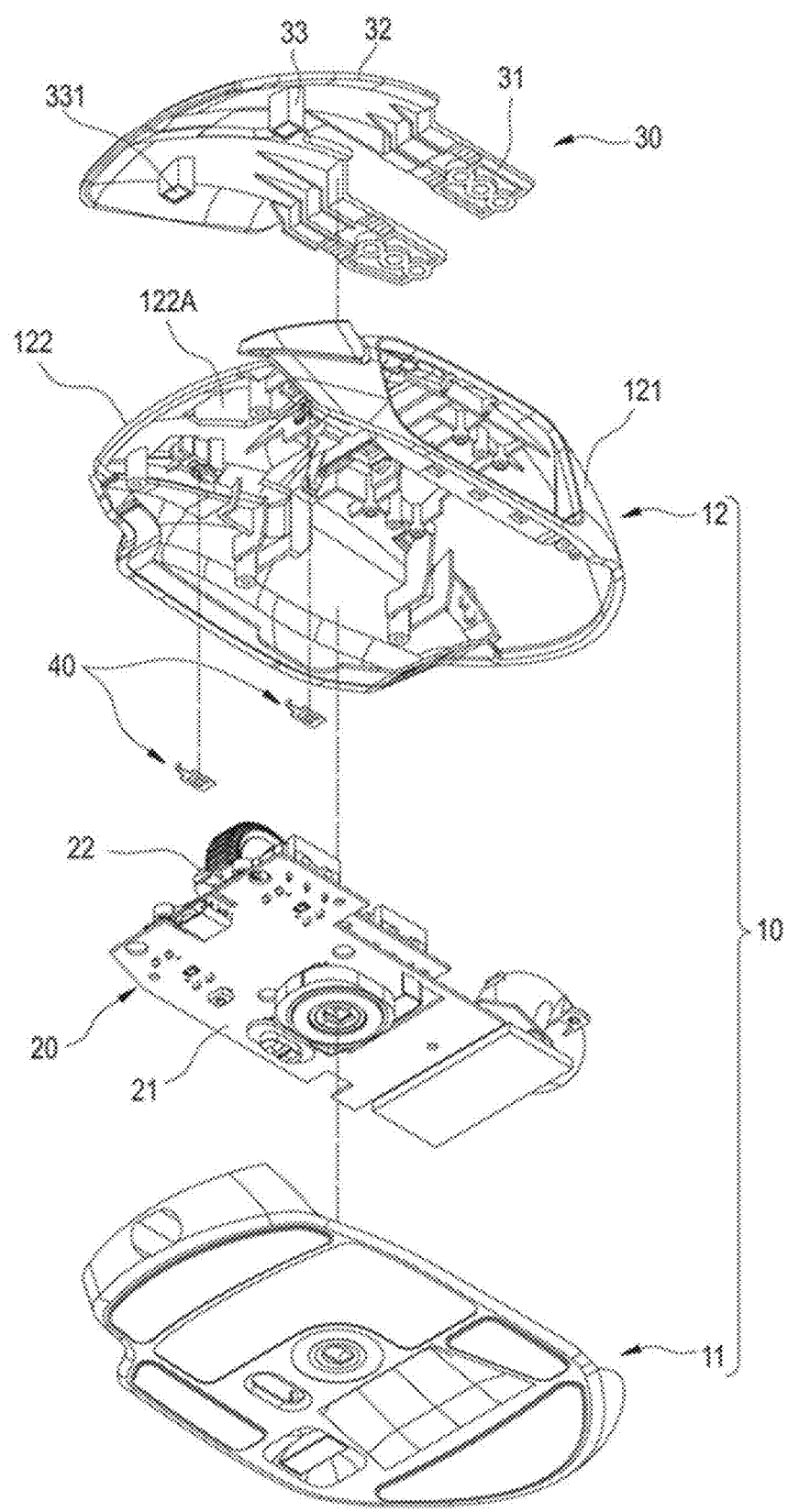
FIG. 2 is a perspective exploded view of the present utility model.

In the above figures:
10: shell, 11: base 12: upper cover, 121: holding surface, 122: mounting surface, 122a: through hole, 123: boss, 123a: support seat, 123b: limit cover, 123c: interlayer space, 123d: retaining wall, 123e: sounding wall, 20: control circuit, 21: circuit board, 22: switch, 30: button, 31: fixing plate, 32: pressing plate, 33: hollow cylindrical body, 331: pressing surface, 332: stop surface, 333: extension space, 40: elastic member, 41: embedded section, 42: elastic part, 421: extending section, 43: pressing part, 44: attachment section, A: pressing block.

DESCRIPTION OF THE EMBODIMENTS

The present utility model will be further described below in conjunction with the accompanying drawings and specific embodiments, so that a person skilled in the art can better understand the present utility model and implement the present utility model. However, the embodiments provided herein are not intended to limit the present utility model.

The present utility model provides a mouse structure. With reference to FIGS. 1 to 5, the mouse structure mainly includes a shell 10, a control circuit 20, a plurality of (two or more) buttons 30, and a plurality of elastic members 40.

The shell 10 includes a base 11 and an upper cover 12. The upper cover 12 is configured to be assembled to cover the base 11. In this embodiment, both the base 11 and the upper cover 12 of the shell 10 are integrally formed by means of plastic injection. However, this is not limited in the present utility model. The base 11 is generally in an oval shape. The upper cover 12 corresponds to the base 11 and is approximately in the shape of an elliptical arc. It has a holding surface 121 and a mounting surface 122. In this embodiment, there is a gap (not labeled in the figures) between the holding surface 121 and the mounting surface 122, so that the mounting surface 122 is lower than the holding surface 121. A through hole 122A is formed through the mounting surface 122. A plurality of bosses 123 extend from the mounting surface 122 of the upper cover 12 toward the base 11. In this embodiment, the number of the bosses 123 is two. However, this is not limited in the present utility model.

The control circuit 20 is arranged on the base 11. In addition, the control circuit 20 is covered by the upper cover 12 and accommodated inside the shell 10. The control circuit 20 mainly includes a circuit board 21 and a plurality of switches 22. The switches 22 are arranged on the circuit board 21 and are arranged corresponding to the positions of the bosses 123.

In this embodiment, the number of the buttons 30 is two, corresponding to the number of the bosses 123. However, this is not limited in the present utility model. Each button 30 includes a fixing plate 31 and a pressing plate 32. In this embodiment, the fixing plate 31 is an L-shaped plate body; the pressing plate 32 is arc-shaped body which is connected to one end of the L-shaped plate body. The fixing plate 31 is fixed on a bottom portion of the holding surface 121 of the upper cover 12 after passing through the through hole 122A on the mounting surface 122. In this way, the pressing plate 32 can be suspended above the mounting surface 122 for the user to press. However, this is not limited in the present utility model. Below the pressing plate 32 of each button 30 is a hollow cylindrical body 33 in which the upper cover 12 is inserted. In addition, each hollow cylindrical body 33 has a pressing surface 331 and a stop surface 332 opposite to each other. Preferably, the pressing surface 331 can also be provided with a pressing block A in order to achieve a better pressing effect on the switch 22. However, the pressing block A is not a necessary component of the present utility model. Hence, the following description will be given by attaching the pressing surface 331 to the surface of the switch 22. In addition, an extension space 333 is formed on a side of the hollow cylindrical body 33 facing the holding surface 121. Moreover, the stop surface 332 is exposed in the extension space 333.

In this embodiment, the number of the elastic members 40 is two, corresponding to the number of the bosses 123. In addition, the elastic member 40 can be made of a metal sheet, a plastic piece, or another elastic material. However, this is not limited in the present utility model. Each elastic member 40 has an embedded section 41, an elastic part 42, and a pressing part 43. Each of the embedded sections 41 is clamped to one of the bosses 123. Each elastic part 42 is connected between the embedded section 41 and the pressing part 43. In addition, each elastic part 42 extends into the extension space 333 and penetrates into the hollow cylindrical body 33. Each pressing part 43 is elastically pressed against the stop surface 332 to pull down the hollow cylindrical body 33. In this way, each pressing surface 331 can be attached to the surface of one switch 22 to ensure that each time the button 30 is pressed, the switch 22 can be triggered to operate. Specifically, with reference to FIG. 4, the embedded section 41 is in the shape of a long strip. The elastic part 42 is generally U-shaped and bridges two ends of the embedded section 41 to form a closed rectangular frame. In addition, the elastic part 42 also reversely extends to form an extending section 421 horizontally at the top end of the U-shape part. The pressing part 43 is connected to the extending section 421 and is generally L-shaped, so as to be pressed against the stop surface 332 of the hollow cylindrical body 33 by an elastic force.

Figure 3:
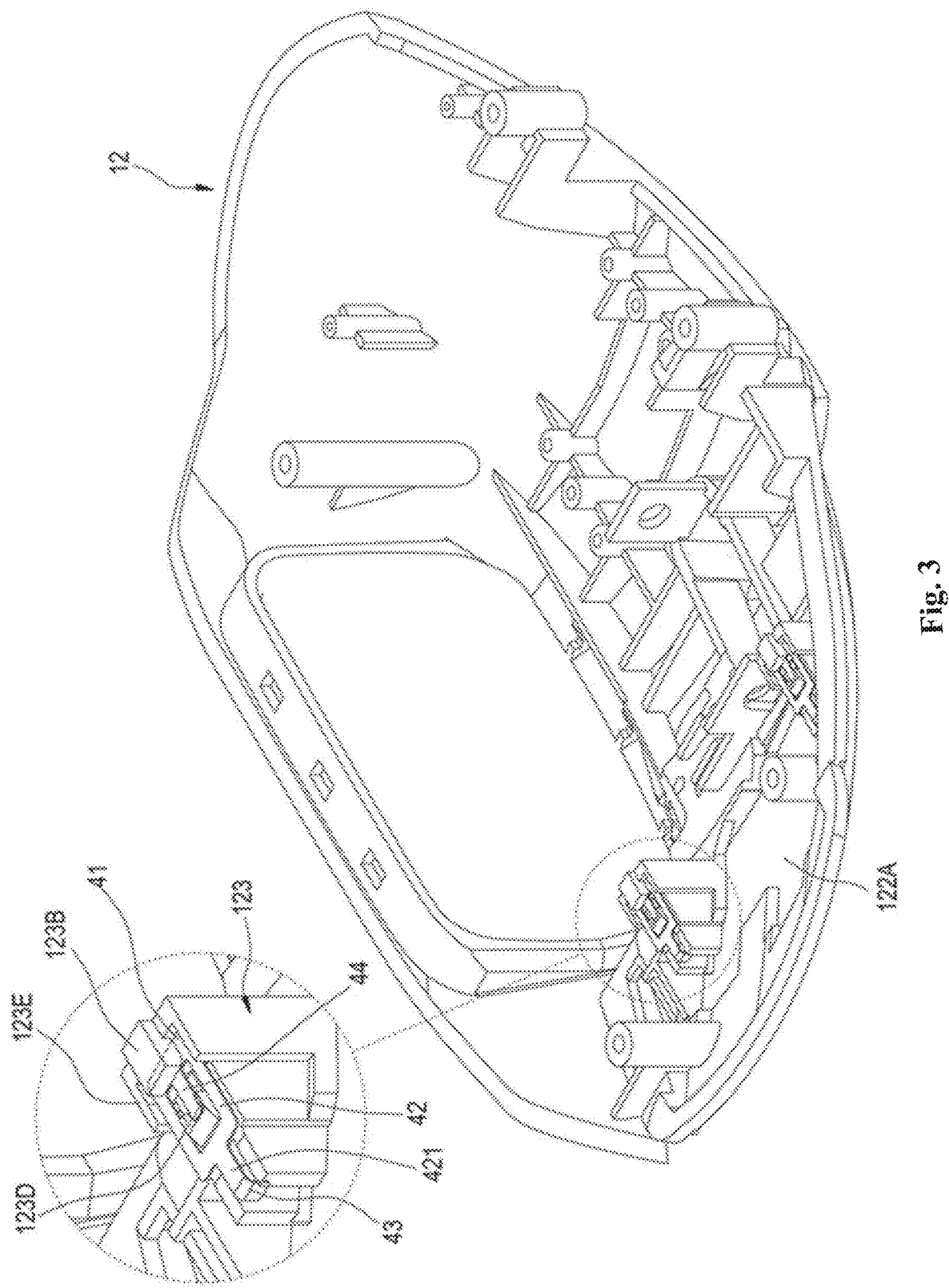
FIG. 3 is a perspective view of the appearance of the elastic member and the upper cover of the present utility model.
Figure 4:
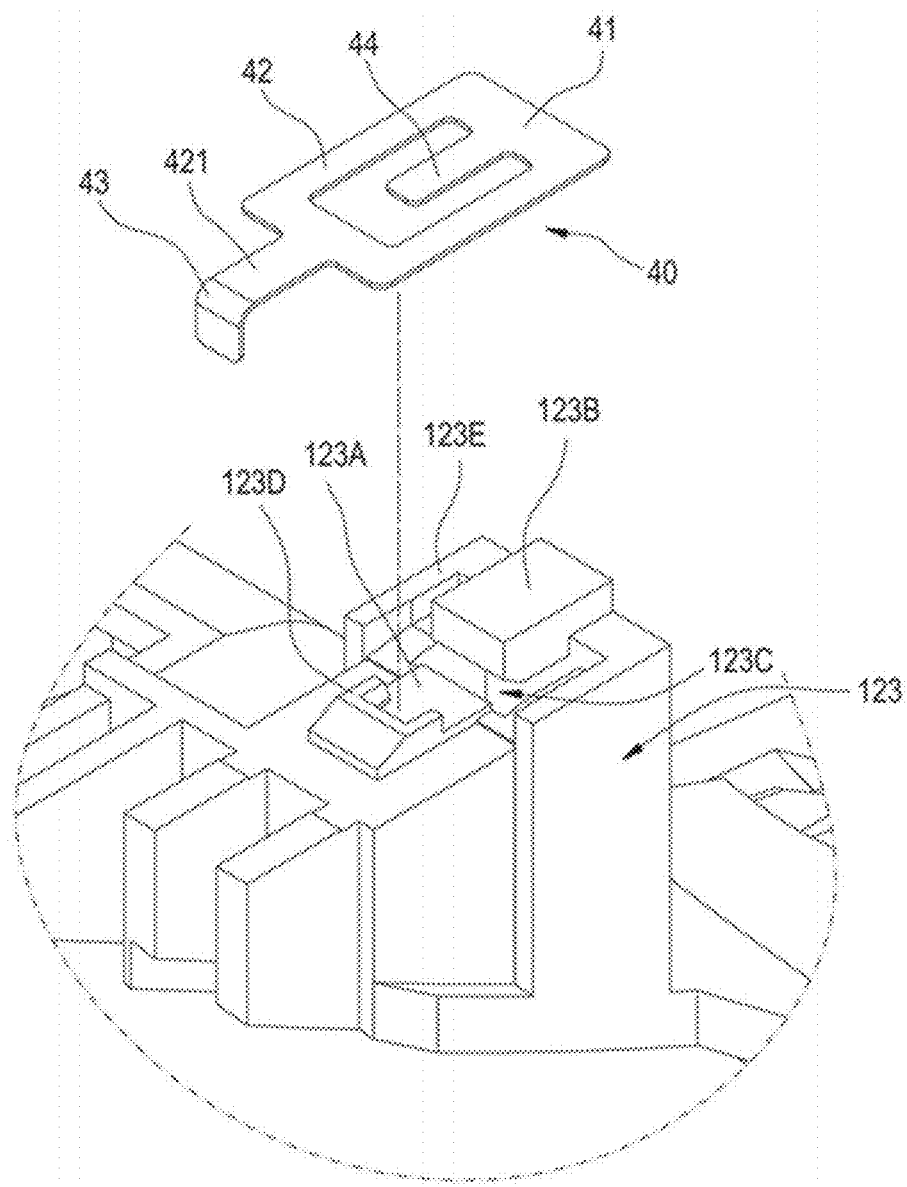
FIG. 4 is a perspective exploded view of the elastic member and the boss of the present utility model.
Figure 5:
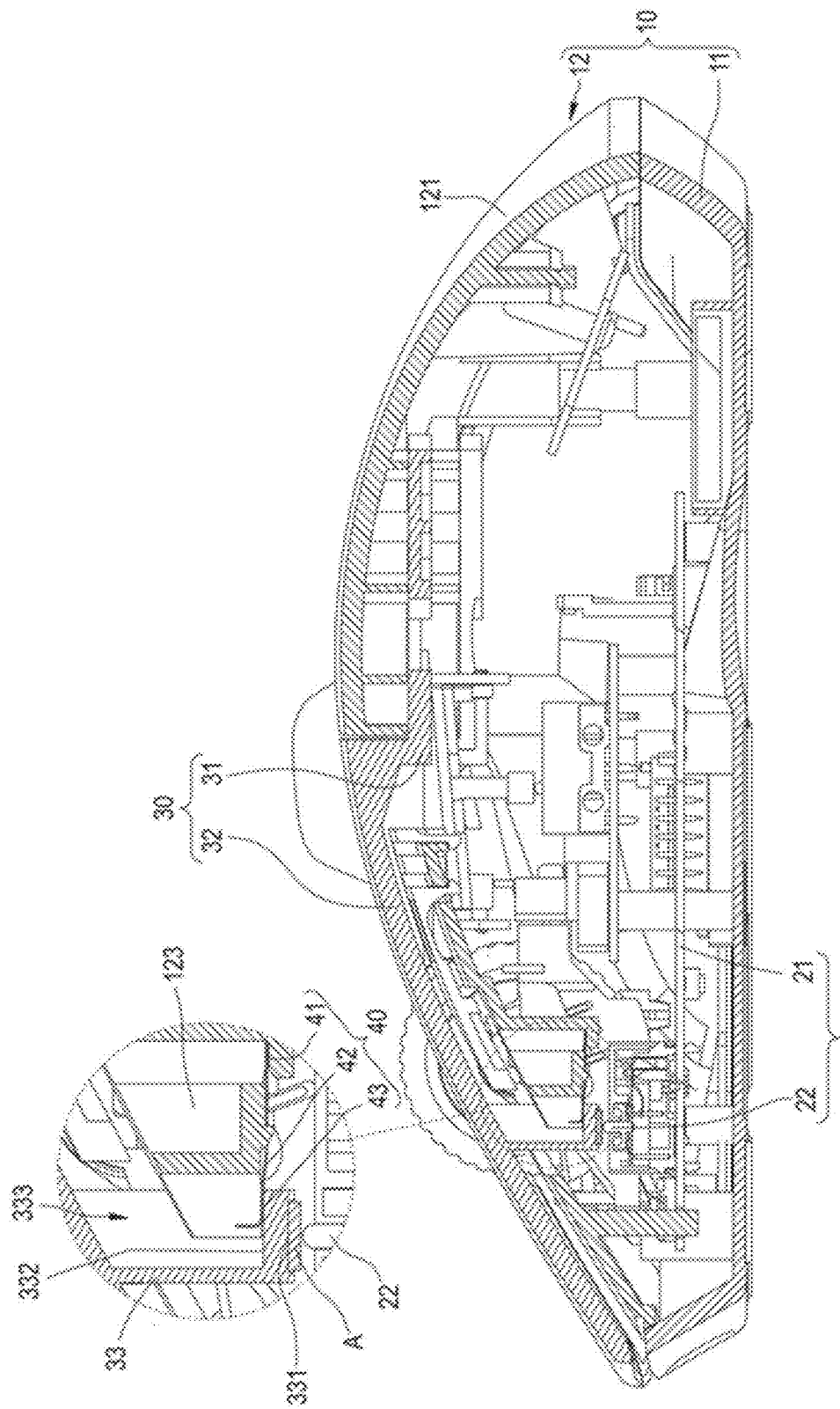
FIG. 5 is a sectional view of the present utility model.

For further description, reference can be made to FIG. 3 and FIG. 4, a support seat 123A is formed by protruding from the top of the boss 123. In this embodiment, the support seat 123A is in the shape of a long strip. However, this is not limited in the present utility model. One end of the support seat 123A also extends to form a limit cover 123B. An interlayer space 123C is formed between the limit cover 123B and the support seat 123A. The elastic member 40 further has an attachment section 44. The attachment section 44 is elongated and extends from the embedded section 41 toward the pressing part 43. The embedded section 41 is inserted and clamped in the interlayer space 123C between the limit cover 123B and the support seat 123A. In addition, the attachment section 44 is attached to the support seat 123A to support the entire elastic member 40. As a result, the elastic part 42 and the pressing part 43 surround the periphery of the support seat 123A and can be in a suspended state.

Preferably, a retaining wall 123D is formed at one end of the support seat 123A away from the limit cover 123B. In addition, a surrounding wall 123E surrounding the support seat 123A extends on the left and right sides of the limit cover 123B. As a result, the retaining wall 123D can limit the attachment section 44 longitudinally and transversely to achieve a position limiting effect. The surrounding wall 123E can limit the embedded section 41 longitudinally and transversely to achieve a position limiting effect. At the same time, by means of cooperating with the interlayer space 123C, the elastic member 40 can be effectively fixed and limited on the boss 123.

With reference to FIG. 5 again, after the button 30 is installed on the upper cover 12, the hollow cylindrical body 33 passes through the mounting surface 122, and an opening of the extension space 333 faces the boss 123. This enables the extending section 421 of the elastic part 42 to penetrate into the extension space 333. In this way, the pressing part 43 is pressed against the stop surface 332 of the hollow cylindrical body 33 to pull down the hollow cylindrical body 33, so as to ensure that the pressing surface 331 can be attached to the surface of the switch 22. As a result, the gap generated by the manufacturing tolerance can be eliminated by an elastic force from the elastic member 40; in addition, the hollow cylindrical body 33, the boss 123 and the elastic member 40 can be easily manufactured. At the same time, the assembly of the parts is also simple and quick, so that the production cost and assembly time can be greatly reduced.

Figure 6:
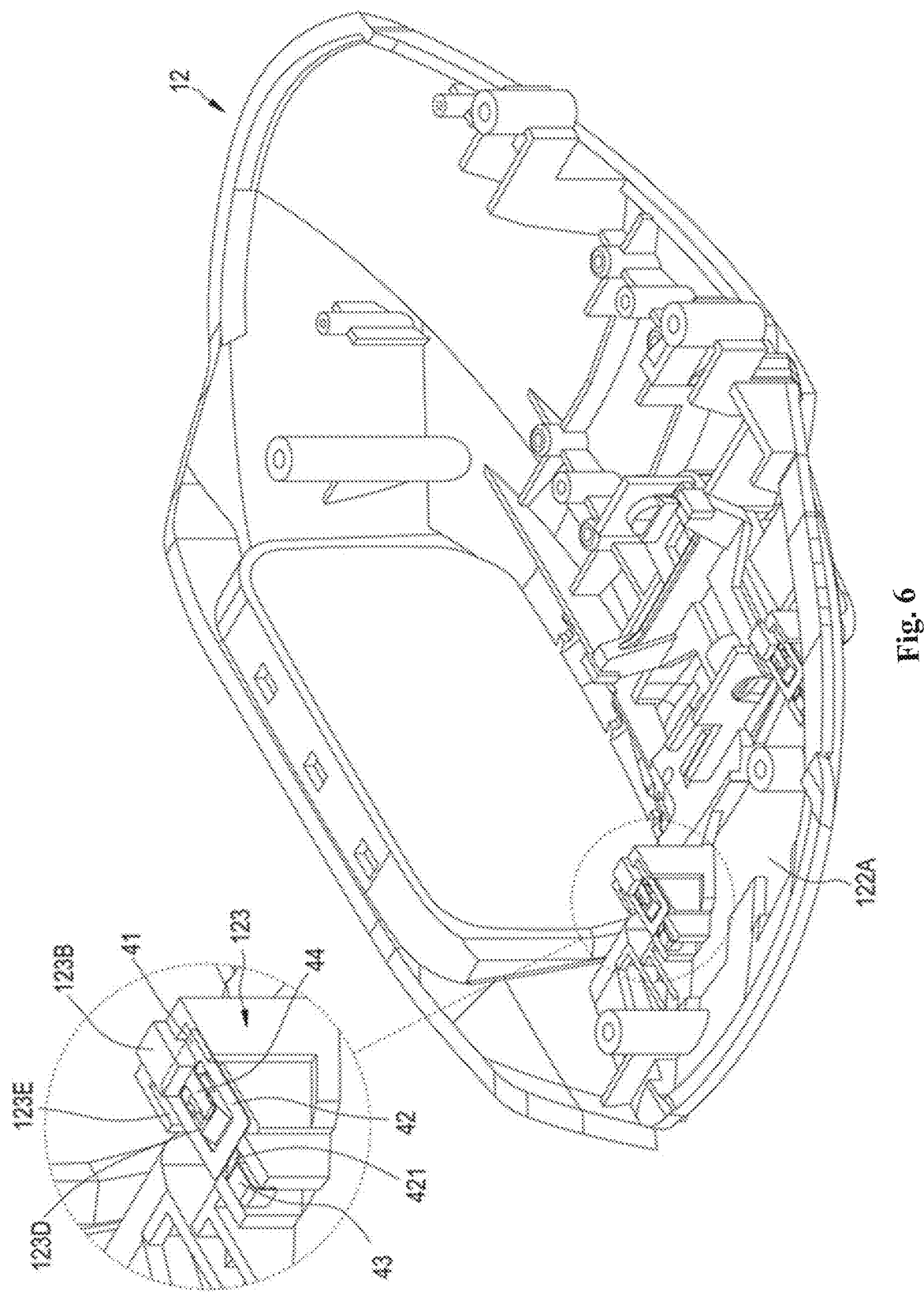
FIG. 6 is a perspective view of the appearance of the elastic member and the upper cover according to another embodiment of the present utility model.
Figure 7:
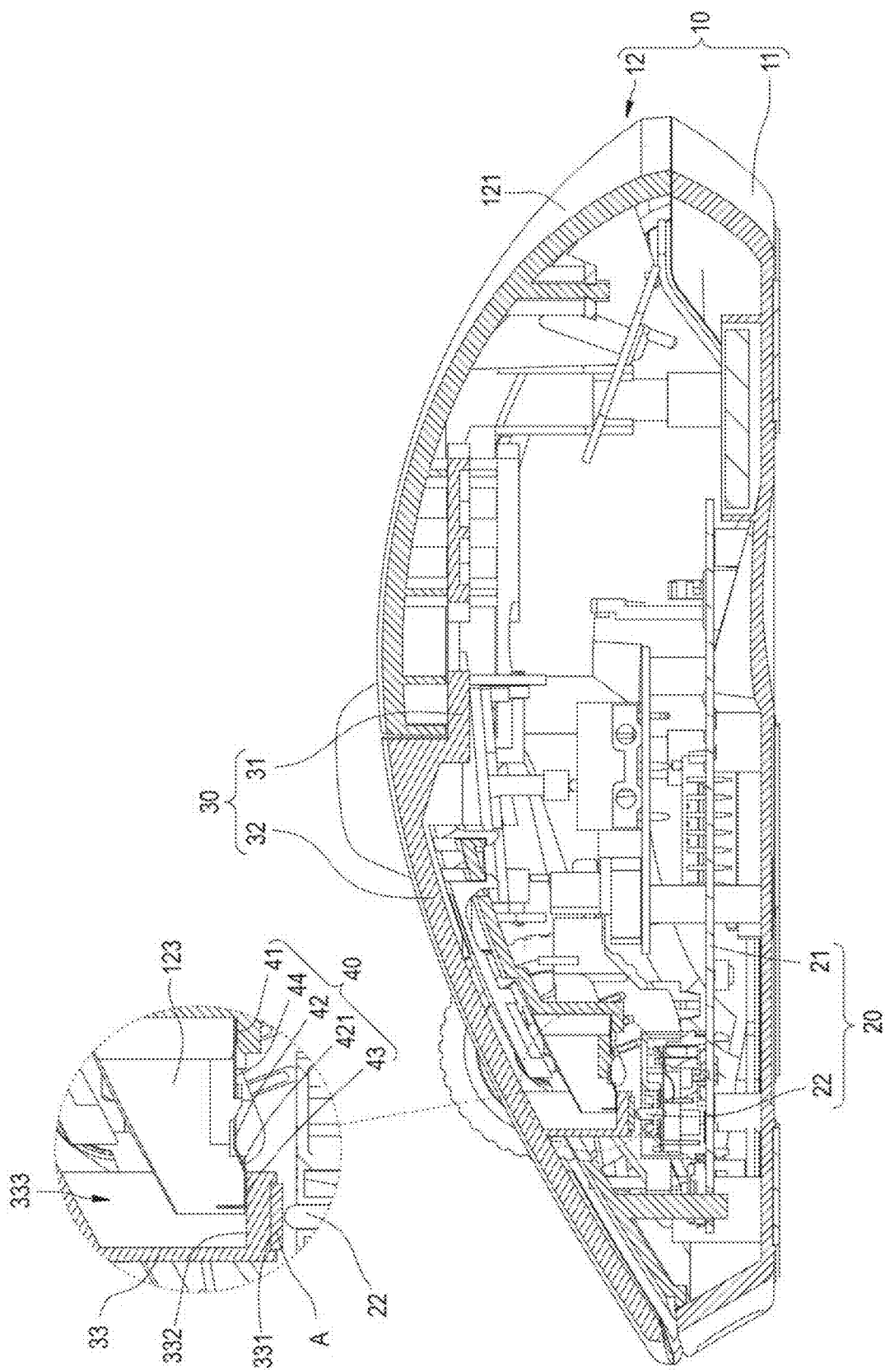
FIG. 7 is a sectional view according to another embodiment of the present utility model.

With reference to FIG. 6 and FIG. 7, the second embodiment of the present utility model will be described below. The main difference is the inclination angle at which the extending section 421 of the elastic member 40 extends. In this embodiment, the extending section 421 extends obliquely toward the switch 22 and is connected to the L-shaped pressing part 43. In this way, the extending section 421 and the pressing part 43 together form a concave structure (as shown in the sectional view provided in FIG. 7), and can be pressed against the stop surface 332 of the hollow cylindrical body 33 by an elastic force. As a result, in the second embodiment, the downwardly inclined extending section 421 can compensate for a relatively large tolerance gap. In addition, this can enhance the pressing elastic force of the pressing part 43 on the stop surface 332, so as to further ensure that the pressing surface 331 is attached to the surface of the switch 22. This can achieve a pre-pressing effect to improve the pressing sensitivity of the button 30.

The above-mentioned embodiments are only some preferred embodiments provided for the purpose of fully illustrating the present utility model. The scope of protection of the present utility model is not limited thereto. Equivalent substitutions or modifications made by a person skilled in the art on the basis of the present utility model are all within the scope of protection of the present utility model. Hence, the scope of protection of the present utility model is defined by the claims.

The invention claimed is:

1. A mouse structure comprising:
a shell, comprising a base and an upper cover covering the base, wherein the upper cover extends toward the base with a plurality of bosses;
a control circuit, arranged on the base, wherein the control circuit comprises a circuit board and a plurality of switches arranged on the circuit board;
a plurality of buttons, wherein each of the buttons comprises a hollow cylindrical body extending through the upper cover, and each of the hollow cylindrical bodies comprises a pressing surface and a stop surface opposite to each other; and
a plurality of elastic members, wherein each of the elastic members comprises an embedded section, an elastic part, and a pressing part, each of the embedded sections is clamped to one of the bosses, each of the elastic parts is connected between one of the embedded sections and one of the pressing parts and extends into one of the hollow cylindrical bodies, and each of the pressing parts is elastically pressed against one of the stop surfaces to pull down one of the hollow cylindrical bodies, so that each of the pressing surfaces is attached to a surface of one of the switches.

2. The mouse structure of claim 1, wherein an extension space is provided on a side of each of the hollow cylindrical bodies, and each of the stop surfaces is exposed in one of the extension spaces.

3. The mouse structure of claim 2, wherein each of the elastic parts is U-shaped and bridges two ends of one of the embedded sections, and each of the elastic parts is respectively extended toward one of the embedded sections with an extending section connected to one of the pressing parts.

4. The mouse structure of claim 3, wherein each of the extending sections extends into one of the hollow cylindrical bodies through one of the extension spaces.

5. The mouse structure of claim 3, wherein each of the extending sections is horizontally extended and connected to one of the pressing parts.

6. The mouse structure of claim 3, wherein each of the extending sections extends obliquely toward one of the switches and is connected to one of the pressing parts.

7. The mouse structure of claim 1, wherein each of the bosses is provided with a support seat, one end of the support seat is formed with a limit cover, and an interlayer space is formed between the limit cover and the support seat for clamping the embedded section.

8. The mouse structure of claim 7, wherein the limit cover is extended with a surrounding wall surrounding the support seat, and the surrounding wall is configured to limit the embedded section.

9. The mouse structure of claim 7, wherein each elastic member extends from one of the embedded sections toward one of the pressing parts with an attachment section, and the attachment section is attached to the support seat.

10. The mouse structure of claim 9, wherein a retaining wall is formed at an end of the support seat away from the limit cover, and the retaining wall limits the attachment section.

* * * * *